United States Patent [19]

Kennon

[11] Patent Number: 5,224,568
[45] Date of Patent: Jul. 6, 1993

[54] POWER GENERATING APPARATUS

[76] Inventor: Woodrow A. Kennon, 512 Sampson, Dyersburg, Tenn. 38024

[21] Appl. No.: 862,712

[22] Filed: Apr. 3, 1992

[51] Int. Cl.⁵ .............................................. F03G 5/02
[52] U.S. Cl. ...................................................... 185/19
[58] Field of Search ................... 185/3, 15, 19, 20, 21, 185/22, 23, 24

[56] References Cited

U.S. PATENT DOCUMENTS

| | | | |
|---|---|---|---|
| 1,302 | 4/1862 | Russell | 384/255 X |
| 100,818 | 3/1870 | Tobey | 185/19 |
| 139,682 | 6/1873 | Marnette | 185/3 |
| 269,980 | 1/1883 | Wolf | 185/19 |
| 276,320 | 4/1883 | Worth | 185/19 |
| 1,121,855 | 12/1914 | McCreery | 185/20 |
| 1,173,852 | 2/1916 | Parks | 185/19 |
| 1,586,728 | 6/1926 | Zbar | 185/15 |
| 1,624,656 | 4/1927 | Bryan, Jr. | 185/19 |

Primary Examiner—Allan D. Herrmann
Attorney, Agent, or Firm—Walker, McKenzie & Walker

[57] ABSTRACT

An apparatus including a power generator for generating power when rotatably driven; a drive axle for rotatably driving the power generator when rotated; a platform supported by the drive axle for rotating the drive axle when moved; and a vehicle attached to the platform for moving the platform.

20 Claims, 2 Drawing Sheets

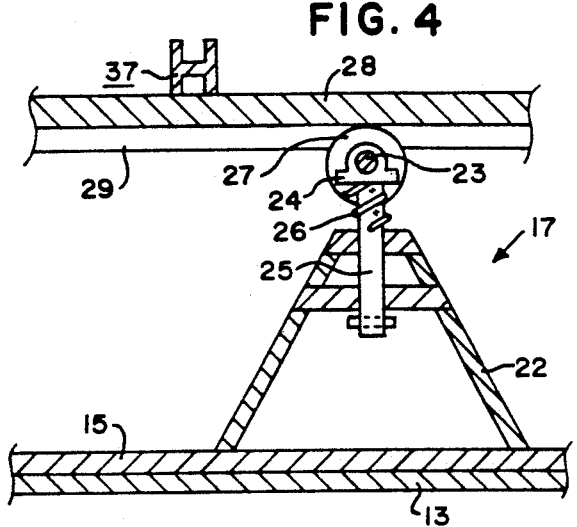
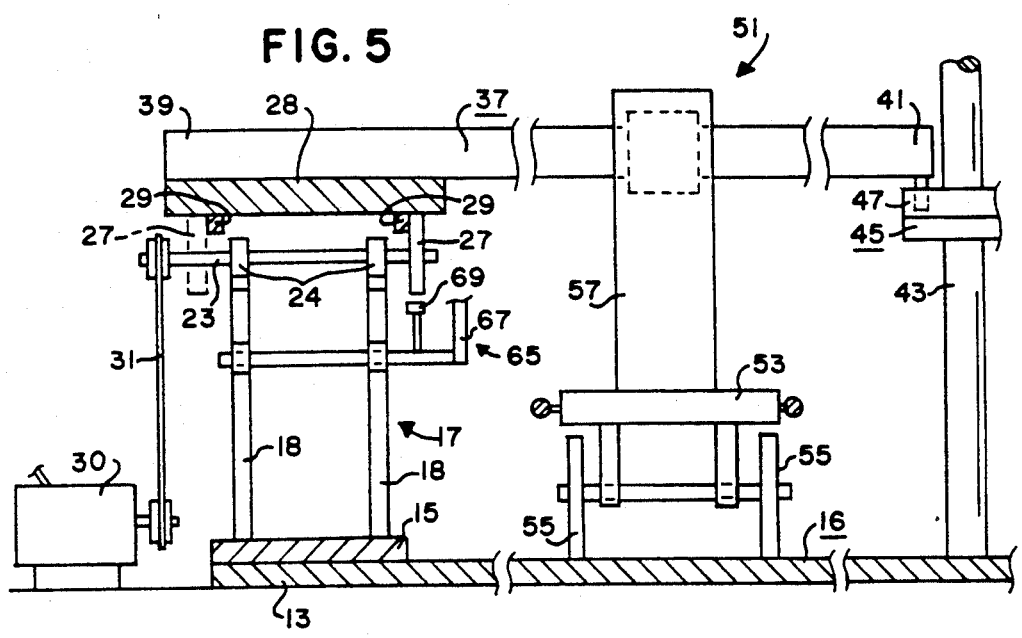
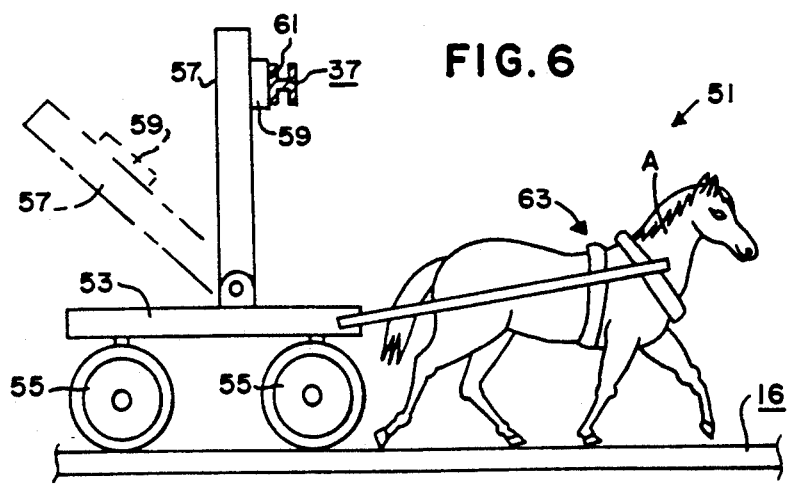

POWER GENERATING APPARATUS

BACKGROUND OF THE INVENTION

1. Field of the Invention

The present invention relates, in general, to an apparatus or means for generating power such as electricity to be used directly or stored in batteries or other storing means.

2. Description of the Related Art

A preliminary patentability search conducted in class 185, subclasses 3, 15, 19 and 20 through 23, disclosed Russell, U.S. Pat. No. 1,302, reissued Apr. 15, 1862; Marnette, U.S. Pat. No. 39,682, issued Jun. 10, 1873; and Zbar, U.S. Pat. No. 1,586,728.

Russell discloses a gear type transmission in which it appears that two drive spur gears transmit rotation to a single driven spur gear with the single driven gear being rotationally supported by a sliding bearing to prevent the two drive gears from binding.

Marnette discloses a device for rotating a pulley which, in turn, drives machinery through a belt. The device includes a rotatable platform for supporting a horse. The horse is harnessed directly to a spindle in a manner to cause the spindle to rotate when the horse walks around the platform. The platform is geared to one end of the spindle so that if the horse makes the platform rotate, the rotation of the platform will also cause the spindle to rotate. The pulley is attached to the other end of the spindle.

Zbar discloses a portable electric current generating plant consisting of a two wheeled cart with a generator connected to one of the wheels so that the generator is driven when the cart is moved.

None of the above patents disclose or suggest the present invention. More specifically, none of the above patents disclose or suggest an apparatus including power generating means for generating power when rotatably driven; drive axle means for rotatably driving the power generating means when rotated; platform means supported by the drive axle means for rotating the drive axle means when moved; and vehicle means attached to the platform means for moving the platform means.

SUMMARY OF THE INVENTION

The present invention is directed toward providing an improved apparatus or means for generating power such as electricity to be used directly or stored in batteries or other storing means. The concept of the present invention is to provide a machine or apparatus for efficiently utilizing animal power (horses, mules, donkeys, llamas, water buffalo, oxen, goats, dogs) and, in emergencies, motor vehicles to generate electricity to be used directly or stored in batteries or other storing means such as pumping water to higher elevations and storing in lakes, reservoirs or tanks, or compressing air or gas, or rotating energy storing flywheels, all of which ensure a constant supply of electricity. In the initial construction of the generating means, motor vehicles could be used as the power source for testing. Animals are preferably used as the power source for economic reasons, non use of fossil fuel, etc.

The apparatus of the present invention includes, in general, power generating means for generating power when rotatably driven; drive axle means for rotatably driving the power generating means when rotated; platform means supported by the drive axle means for rotating the drive axle means when moved; and vehicle means attached to the platform means for moving the platform means.

BRIEF DESCRIPTION OF THE DRAWINGS

FIG. 4 is a sectional view similar to FIGS. 2 and 3 but showing a third alternate embodiment of certain support structure thereof.

FIG. 5 is a sectional view of a portion thereof substantially as taken on line 5—5 of FIG. 1 on an enlarged scale.

FIG. 6 is a sectional view of a portion thereof substantially as taken on line 6—6 of FIG. 1 on an enlarged scale.

DESCRIPTION OF THE PREFERRED EMBODIMENT

Figure 1:
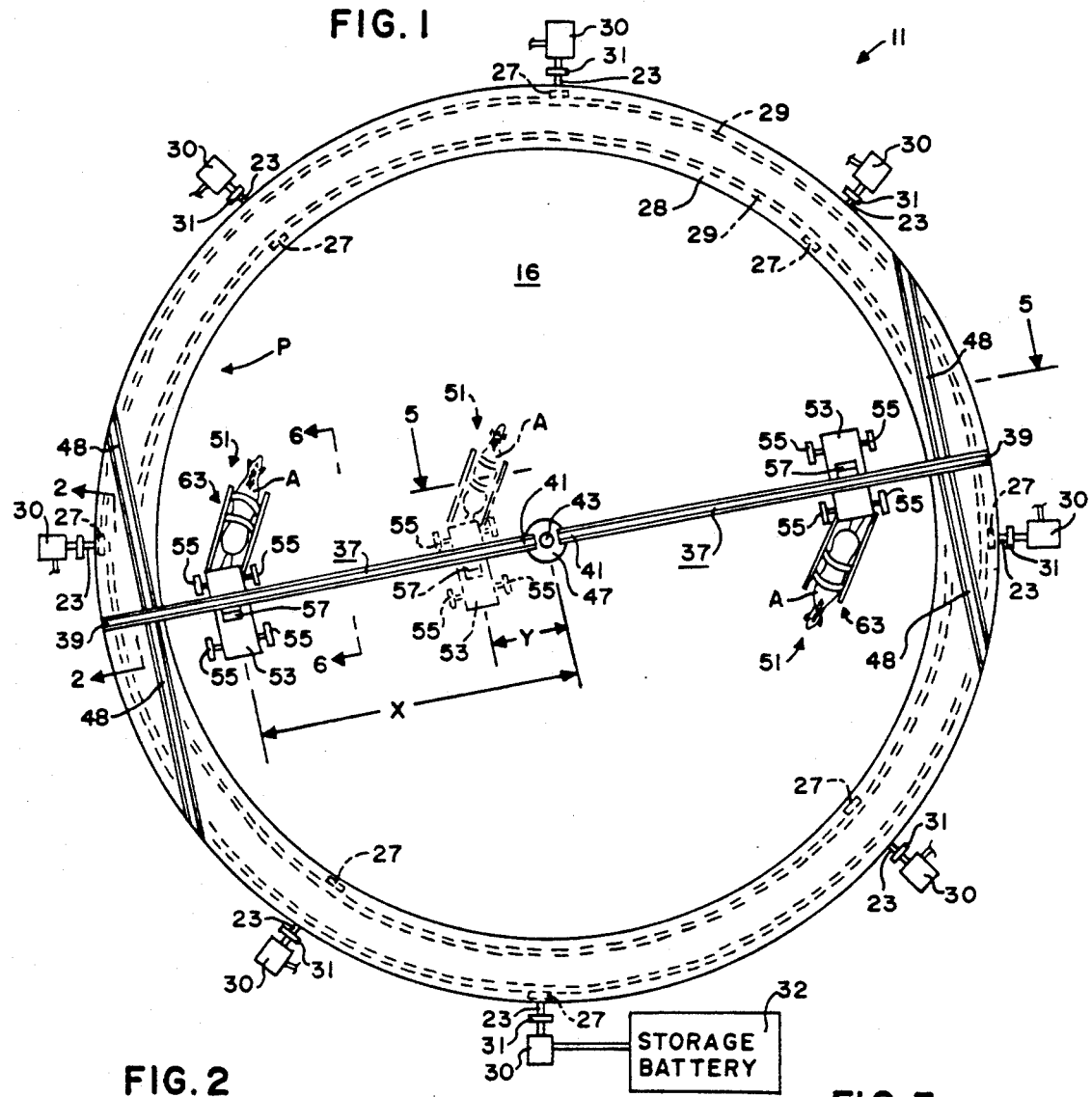
FIG. 1 is a top plan view of the preferred embodiment of the power generating apparatus or means of the present invention with certain portions thereof shown in broken lines in a moved position and with certain portions thereof omitted for clarity.

The preferred embodiment of the power generating means or apparatus of the present invention is shown in FIGS. 1-6 and identified by the numeral 11.

The generating means 11 includes a foundation 13 of level ground, wood flooring, or other suitable material. The foundation 13 may be located in a level open field or in an enclosed building, etc. The foundation 13 may be as large or as small as desired, within practical limits. For example, the foundation 13 may be a circle that is approximately 150 feet (45.8 meters) in diameter.

A circular ring-shaped or annular reinforced area 15 is preferably positioned on top of the foundation 13 and fixedly attached thereto. The size of the annular reinforced area 15 may also vary as desired. The outer diameter of the annular reinforced area 15 is preferably substantially the same as the diameter of the foundation 13 (e.g., approximately 150 feet) with a distance between the inner diameter of the annular reinforced area 15 to the outer diameter of the annular reinforced area 15 of approximately 6 feet (1.8 meters), thereby leaving a center portion of the foundation 13 that is approximately 138 feet (42 meters) in diameter to form a circular track or field 16 for reasons that will hereinafter become apparent.

Support means 17 is provided on the annular reinforced area 15 for supporting a portion of the generating means 11 a certain distance (e.g., about 5 feet or 1.5 meters) above the foundation 13.

Figure 2:
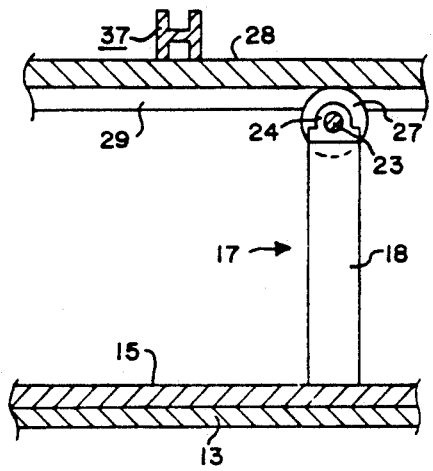
FIG. 2 is a sectional view of a portion thereof substantially as taken on line 2—2 of FIG. 1 on an enlarged scale.

A first embodiment of the support means 17 is shown in FIGS. 2 and 5. In this embodiment, the support means 17 includes a plurality of support pillars 18 that are preferably arranged groups of transversely spaced apart pairs with a plurality of groups equally spaced from one another along the entire length of the annular reinforced area 15. Each support pillar 18 may consist of a vertical post or the like with the bottom end thereof securely anchored to the annular reinforced area 15, etc., as will now be apparent to those skilled in the art.

Figure 3:
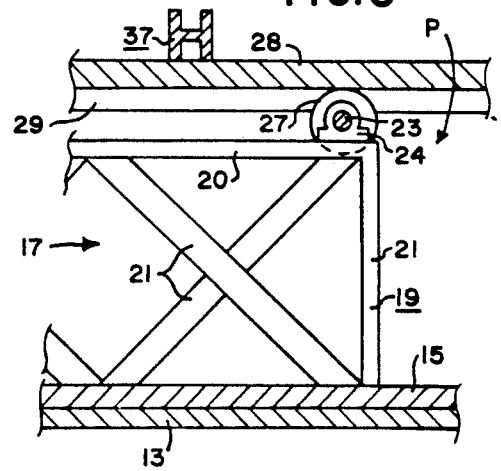
FIG. 3 is a sectional view similar to FIG. 2 but showing an alternate embodiment of certain support structure thereof.

A second embodiment of the support means 17 is shown in FIG. 3. In this embodiment, the support means 17 includes a raised bed 19 that extends about the annular reinforced area 15 (see FIG. 3). The raised bed 19 may consist of a truss-like structure including a top plate 20 supported by a plurality of frame members 21 which extend between the annular reinforced area 15 and the top plate 20 with the lower ends of the frame members 21 securely anchored to the annular reinforced area 15, etc., as will now be apparent to those skilled in the art. The raised bed 19 preferably extends almost continuously about substantially the entire length of the annular reinforced area 15 except for one or more passageways P which allows vehicles and horses, etc., to pass therethrough into and out of the circular field 16 as will hereinafter become apparent.

A third embodiment of the support means 17 is shown in FIG. 4. In this embodiment, the support means 17 includes a plurality of support pillars 22 that are preferably equally spaced from one another along the entire length of the annular reinforced area. Each of these support pillars 22 preferably includes a body member having the shape of an isosceles trapezoid with the lower bas being fixedly anchored to the annular reinforced area 15, etc., as will now be apparent to those skilled in the art, with the sides forming angles with the lower base of about 45 degrees, and with the upper base being parallel to the foundation 13 and reinforced area 15 to provide a flat, level surface as shown in FIG. 4.

The generating means 11 includes power generating means for generating power when rotatably driven.

The generating means 11 includes drive axle means for rotatably driving the power generating means when rotated. More specifically, a plurality of spaced apart shafts 23 are rotatably mounted to the upper end or apex of the support means 17. The shafts 23 are preferably equally spaced from one another along the entire length of the support means 17 and about the entire length of the annular reinforced area 15. Preferably, each shaft 23 is rotatably supported by a pair or more of spaced apart bearing assemblies 24 mounted on the upper end or apex of the support means 17 (see FIG. 5). A spring mechanism may be provided to movably attach each shaft 23 to the support means 17 as shown in FIG. 4. More specifically, each bearing assembly 24 may be attached to the upper end of a rod member 25 that is, in turn, slidably mounted in an upright, vertical position on the upper end or apex of the support means 17 directly beneath each shaft 23, and a coil spring 26 may be associated with each rod member 25 between the upper end or apex of the support means 17 and the bottom of each bearing assembly 24 to thereby normally urge the bearing assembly 24 and associated shaft 23 upward from the upper end or apex of the support means 17 as will now be apparent to those skilled in the art.

One or more wheels 27 are fixedly and securely attached to each shaft 23 so that the shaft 23 will rotate when an associated wheel 27 rotates as will now be apparent to those skilled in the art.

The generating means 11 includes platform means supported by the drive axle means for rotating the drive axle means when moved. More specifically, the platform means preferably includes a circular ring-shaped or annular plate means or platform 28 supported by and on top of the wheels 27 so that rotation of the platform 28 will cause the wheels 27 to rotate. The annular platform 28 is preferably substantially the same size as the annular reinforced area 15. Thus, the annular platform 28 preferably has an outer diameter of approximately 150 feet (45.8 meters) and an inner diameter of approximately 138 feet (42 meters). The combination support means 17 and wheels 27 coact to support the annular platform 28 a distance, e.g., approximately 6 feet (1.8 meters) above the foundation 13 to allow vehicles and horses, etc., to pass thereunder into and out of the circular field 16 as will hereinafter become apparent.

Each shaft 23 may include a first or inner wheel 27 fixedly attached thereto in a position so as to engage the bottom surface of the annular platform 28 substantially adjacent the inner edge or diameter thereof, and a second or outer wheel 27 fixedly attached thereto in a position so as to engage the bottom surface of the annular platform 28 substantially adjacent the outer edge or diameter thereof. However, each shaft 23 may include only a single wheel 27 with the wheels 27 associated with each adjacent shaft 23 positioned so as to engage the annular platform 28 adjacent opposite edges thereof in a zig-zag pattern as clearly shown in FIG. 1. More specifically, one shaft 23 may have an inner wheel 27 fixedly attached thereto in a position so as to engage the bottom surface of the annular platform 28 substantially adjacent the inner edge or diameter thereof while the adjacent shafts 23 have outer wheels 27 fixedly attached thereto in a position so as to engage the bottom surface of the annular platform 28 substantially adjacent the outer edge or diameter thereof, etc. This zig-zag pattern of the wheels 27 will cause the annular platform 28 to be stably supported on top of the wheels 27 as will now be apparent to those skilled in the art. The bottom surface of the annular platform 28 preferably includes a pair of spaced apart circular guide rails or tracks 29 for guidingly engaging the wheels 27 to help guide the annular platform 28 around the annular reinforced area 15 as will now be apparent to those skilled in the art.

The power generating means preferably includes a typical electrical generator 30 drivably coupled to each shaft 23 either by being directly coupled to one distal end of each shaft 23 or by being coupled to a shaft 23 through a typical pulley-and-belt mechanism 31, etc., as will now be apparent to those skilled in the art, whereby rotation of each shaft 23 will cause the associated generator 30 to generate electricity as will now be apparent to those skilled in the art. Typical spring-loaded idler roller means or the like (not shown) are preferably associated with each pulley-and-belt mechanism 31 used to transfer rotation of a shaft 23 to an associated generator 30 when that shaft 23 is supported by a spring mechanism as shown in FIG. 4 to take up any slack caused by the up and down movement of that shaft 23, etc., as will now be apparent to those skilled in the art. Each generator 30 may be electrically coupled to typical storage batteries 32 through a rectifier and voltage regulator (not shown), or the like, or to some other type of storage means, or directly to a power grid, etc. by suitable electrical wiring, as will now be apparent to those skilled in the art.

Rotation of the annular platform 28 will cause the wheels 27 to rotate, thereby causing the shafts 23 to rotate, thereby driving the generators 30 and causing electricity to be generated.

The generating means 11 includes one or more booms or beams 37 having outer ends 39 fixedly attached to the annular platform 28 and having inner ends 41 rotatably mounted above the center of the foundation 13. More specifically, a center post 43 is preferably fixedly attached to the center of the foundation 13 with the longitudinal axis of the center post 43 extending vertically upward from the center of the foundation 13, the center of the annular reinforced area 15, and the center of the annular platform 28. The center post 43 may consist of an elongated wood or metal post with its lower end securely anchored to the center of the foundation 13 as will now be apparent to those skilled in the art. If the generating means 11 is located within an enclosed building, the center post 43 may extend to the roof of the building and act as a structural support, etc. A collar 45 with a bearing assembly may be rotatably attached to the center post 43 approximately 6 feet (1.8 meters) above the surface of the foundation 13 for receiving and supporting the inner ends 41 of the beams 37. A bearing assembly 47 may be provided to attach the inner ends 41 of the beams 37 to the collar 45 and to allow the inner ends 41 of the beams 37 to easily pivot about the center post 43. With the outer ends 39 of the beams 37 attached to the annular platform 28 and with the inner ends 41 of the beams 37 attached to the collar 45, the beams will be positioned above the surface of the field 16 approximately 6 feet (1.8 meters) to allow vehicles and horses, etc., to pass thereunder as will hereinafter become apparent. Each beam 37 may be made out of wood, metal or other suitable material with enough strength to withstand any stress that may be put upon it. For example, each beam 37 may be a standard "H" shaped aluminum wide flange beam with the flat sides arranged vertically. On the other hand, each beam may consist of a build-up girder or truss constructed on the principle of a suspension bridge or the like. One or more cross beams 48 may be provided at the outer end 39 of each beam 37 to reinforce the attachment of the outer end 39 of each beam 37 to the annular platform 28 as will now be apparent to those skilled in the art. The outer end 39 of each beam 37 and each cross beam 48 may be fixedly attached to the annular platform 28 in any manner now apparent to those skilled in the art such as, for example, by welding, bolting, or the like. The length of each beam 37 will, of course, depend on the overall size of the annular platform 28. Thus, when the annular platform 28 has an outer diameter of approximately 150 feet (45.8 meters), each beam 37 should have a length of approximately 75 feet (22.9 meters).

The generating means 11 includes a drive or vehicle means coupled to the platform means for moving the platform means. More specifically, the generating means 11 preferably includes one or more drive means for pushing or pulling the beams 37 about the center post 43 and, thereby, causing the annular platform 28 to rotate which, in turn, causes the wheels 27 and shafts 23 to rotate and activate the electrical generators 30 as will now be apparent to those skilled in the art.

Each drive means preferably includes a vehicle 51 having a flat bed trailer 53 rollably supported by wheels 55. A mast 57 similar to the mast of a typical fork lift truck or the like is preferably attached to the flat bed trailer 53. A carriage 59 is slidably attached to the mast 57 in any manner now apparent to those skilled in the art such as, for example, in the same manner that a typical fork carriage is attached to the mast of a typical fork lift truck. Rather than having typical forks or the like, the carriage 59 is preferably designed to engage a beam 37 in a manner which will cause the beam 37 to be pushed about the center post 43 when the vehicle 51 is moved on the circular field 16 around the center post 43 as will hereinafter become apparent. Thus, the carriage 59 may include a substantially flat face 61 for engaging a flat side of a beam 37 as clearly shown in FIG. 6 to push the beam 37 around the center post 43 as will now be apparent to those skilled in the art.

The mast 57 preferably includes typical lift and tilt means (not shown), etc., including hydraulic pistons, drive chains, or the like, for moving the carriage 59 up and down on the mast 57 to properly and precisely position the face 61 of the carriage 59 adjacent one side of a beam 37, for tilting the mast 57 and carriage 59 forward and backward, etc., as will now be apparent to those skilled in the art.

Each vehicle 51 may be motorized for being driven in circles on the field 16 about the center post 43. However, each vehicle 51 is preferably coupled to a draft animal A such as a horse by a typical harness assembly 63 to allow the draft animal A to pull the vehicle 51 in circles on the field 16 about the center post 43 as will now be apparent to those skilled in the art.

As will now be apparent to those skilled in the art, as the vehicle 51 is driven or pulled in circles on the field 16 about the center post 43 preferably in a clock-wise direction with the face 61 of the carriage 59 engaging a side of a beam 37, the beam 37 will also rotate about the center post 43 and will, in turn, cause the annular platform 28 to rotate. Rotation of the annular platform 28 will cause the wheels 27 and shafts 23 to rotate, thereby causing the generators 30 to generate electricity. Each vehicle 51 is preferably positioned at the perimeter of the field 16 at start-up to thereby provide the greatest mechanical advantage, making it relatively easy to start the various components rotating (i.e., with each vehicle 51 at the perimeter of the field 16 as shown in solid lines in FIG. 1, the effective length X of the lever arm between the center post 43 and the vehicle 51 will be the greatest). However, each carriage 59 is preferably slidably associated with a respective beam 37 so that as a draft animal A picks up speed and momentum after starting the various components to rotate, the draft animal A and associated vehicle 51 can start moving slowly in a spiraling path toward the center post 43 whereby the speed of rotation of the annular platform 28, etc., will increase if the speed of the vehicle 51 remains constant due to the shorter effective length Y of the lever arm between the center post 43 and the vehicle 51 as shown in FIG. 1 as will now be apparent to those skilled in the art. The spiraling path thus becomes smaller as the draft animal A moves closer to the center post 43. Thus, for example, with an annular platform 28 having a diameter of 150 feet (45.8 meters), if the distance X between the center post 43 and the vehicle 51 at start-up is 65 feet (19.8 meters) and the vehicle 51 is moving at about 3 miles per hour (4.8 kilometers per hour), the annular platform 28 would be moving at about 3.5 miles per hour (5.6 kilometers per hour). However, if the distance Y between the center post 43 and the vehicle 51 is 25 feet (7.6 meters) and with the vehicle 51 still moving at about 3 miles per hour (4.8 kilometers per hour), the annular platform 28 would be moving at about 9 miles per hour (14.5 kilometers per hour), etc., as will now be apparent to those skilled in the art.

The generating means 11 may include brake means 65 for selectively slowing down and stopping the annular platform 28. The specific design, construction and operation of the brake means 65 can vary without departing from the spirit and scope of the invention. Thus, the brake means 65 could consist of a typical shoe-and-drum or disc-and-caliper type mechanism associated with each wheel 27, etc., or could consist of a simple lever 67 adapted to allow an operator to force a brake shoe 69 against the perimeter of a wheel 27, etc., as shown in FIG. 7 as will now be apparent to those skilled in the art. A plurality of such levers 67 are preferably operatively coupled together by cables or the like to allow the operator to force a plurality of brake shoes 69 against a plurality of wheels 27 by moving a single lever or the like as will now be apparent to those skilled in the art.

As thus constructed, the present invention provides an apparatus for generating electricity that ca be easily adapted to meet various conditions. In operation, one or more vehicles 51 are driven through a passageway P or the like, onto the field 16, and into position adjacent a beam 37. The carriage 59 of the lift mast means 57 of the vehicle 51 is then positioned so that the flat face 61 thereof engages the rear side of the beam 37 whereby movement of the vehicle 51 in circles around the center post 43 will cause the annular platform 2 to be driven around the center post 43 which, in turn, will cause the wheels 27 to rotate thereby driving the electrical generators 30 through the pulley-and-belt mechanisms 31. The electricity so generated by the electrical generators 30 can be stored in storage batteries 32, or transferred directly to a power grid, etc.

Although the present invention has been described and illustrated with respect to a preferred embodiment and a preferred use therefor, it is not to be so limited since modifications and changes can be made therein which are within the full intended scope of the invention.

I claim:

1. An apparatus for generating power, the apparatus comprising:
   a) power generating means for generating power when rotatably driven;
   b) drive axle means for rotatably driving the power generating means when rotated;
   c) platform means supported by the drive axle means for rotating the drive axle means when rotated;
   d) a center post located substantially at the center of the platform means;
   e) a drive beam having an outer end fixedly attached to the platform means, having an inner end rotatably attached to the center post, and having a substantially flat trailing side; and
   f) vehicle means including a carriage means having a substantially flat face for slidably engaging the substantially flat trailing side of the drive beam at a point between the outer and inner ends thereof and for pushing the drive beam about the center post so that the platform means will rotate when the vehicle means is moved around the center post.

2. The apparatus of claim 1 in which the drive axle means includes a shaft, and in which the drive axle means includes wheel means fixedly attached to the shaft for supporting the platform means and for causing the shaft to rotate when the platform means is moved.

3. The apparatus of claim 2 in which is included a drive beam fixedly attached to the platform means and extending therefrom; and in which the vehicle means includes a carriage means for engaging the drive beam and for causing the drive beam to move when the vehicle means is moved.

4. The apparatus of claim 2 in which is included a field for supporting the vehicle means and for allowing the vehicle means to move thereover.

5. The apparatus of claim 4 in which the field is circular; in which the central post is vertically standing and is located at the center of the circular field; in which the platform means includes a plate means having a circular aperture therethrough for being positioned with the circular aperture thereof substantially centered about the center post.

6. The apparatus of claim 5 in which the circular aperture through the plate means is substantially coextensive with the circular field.

7. The apparatus of claim 6 in which is included support means for rotatably supporting the drive axle means a spaced distance above the level of the circular field for thereby positioning the plate means and the drive beam a spaced distance above the circular field.

8. The apparatus of claim 7 in which is included a plurality of spaced apart drive axle means in an annular path adjacent the circular aperture through the plate means for stably supporting the plate means.

9. The apparatus of claim 8 in which the vehicle means includes a trailer for being pulled by a draft animal.

10. An apparatus used in combination with a draft animal for generating electrical energy, the apparatus comprising:
    a) a circular field;
    b) a vertically standing center post at the center of the circular field;
    c) electrical energy generating means for generating electrical energy when rotatably driven;
    d) drive axle means for rotatably driving the electrical energy generating means when rotated; the drive axle means including a shaft and including wheel means fixedly attached to the shaft for causing the shaft to rotate when rotatably driven;
    e) platform means supported by the wheel means of the drive axle means for rotating the drive axle means when moved; the platform means including a plate means having a circular aperture therethrough for being positioned with the circular aperture thereof substantially centered about the center post;
    f) a drive beam having an outer end fixedly attached to the plate means of the platform means and having an inner end rotatably attached to the center post; and
    g) vehicle means supported on the circular field coupled to the draft animal for being moved by the draft animal around the center post and for moving the plate means of the platform means around the center post; the vehicle means including a carriage means for engaging the drive beam and for causing the drive beam to move when the vehicle means is moved.

11. The apparatus of claim 10 in which the circular aperture through the plate means is substantially coextensive with the circular field.

12. The apparatus of claim 10 in which is included support means for rotatably supporting the drive axle means a spaced distance above the level of the circular field for thereby positioning the plate means and the drive beam a spaced distance above the circular field.

13. The apparatus of claim 12 in which is included a plurality of spaced apart drive axle means in an annular path adjacent the circular aperture through the plate means for stably supporting the plate means.

14. The apparatus of claim 13 in which the vehicle means includes a trailer for being pulled by the draft animal.

15. The apparatus of claim 10 in which the carriage means of the vehicle is slidable relative to the drive beam for allowing the vehicle to move in a spiral fashion about the center post between a first position a first distance from the center post and a second position a second distance from the center post, the first distance being greater than the second distance.

16. An apparatus used in combination with a plurality of draft animals for generating electrical energy, the apparatus comprising:
   a) a circular field;
   b) a vertically standing center post at the center of the circular field;
   c) a plurality of electrical energy generating means for generating electrical energy when rotatably driven;
   d) a plurality of drive axle means for rotatably driving the electrical energy generating means when rotated; each drive axle means including a shaft and including wheel means fixedly attached to the shaft for causing the shaft to rotate when rotatably driven;
   e) platform means supported by the wheel means of the drive axle means for rotating the drive axle means when moved; the platform means including a plate means having a circular aperture therethrough for being positioned with the circular aperture thereof substantially centered about the center post;
   f) a plurality of drive beams, each drive beam having an outer end fixedly attached to the plate means of the platform means and having an inner end rotatably attached to the center post; and
   g) a plurality of vehicle means for moving the plate means of the platform means around the center post, each of said vehicle means including a trailer for being supported on the circular field and pulled by at least one of the draft animals and for being moved by the draft animals around the center post to move the plate means of the platform means around the center post; each vehicle means including a carriage means for engaging a drive beam and for causing that drive beam to move when the vehicle means is moved; the carriage means of each vehicle being slidable relative to the associated drive beam for allowing each vehicle to move in a spiral fashion about the center post between a first position a first distance from the center post and a second position a second distance from the center post, the first distance being greater than the second distance.

17. The apparatus of claim 16 in which the circular aperture through the plate means is substantially coextensive with the circular field.

18. The apparatus of claim 16 in which is included support means for rotatably supporting the drive axle means a spaced distance above the level of the circular field for thereby positioning the plate means and the drive beam a spaced distance above the circular field.

19. The apparatus of claim 18 in which is included a plurality of spaced apart drive axle means in an annular path adjacent the circular aperture through the plate means for stably supporting the plate means.

20. The apparatus of claim 19 in which the bottom surface of said plate means of said platform means includes a pair of spaced apart circular guide tracks for guidingly engaging said wheel means.

* * * * *